United States Patent [19]

Miceli

[11] Patent Number: 6,010,215
[45] Date of Patent: Jan. 4, 2000

[54] MAKEUP EYEGLASSES

[76] Inventor: Sylvana Miceli, 40 Rock Spring Ave., West Orange, N.J. 07052

[21] Appl. No.: 09/274,756

[22] Filed: Mar. 23, 1999

[51] Int. Cl.⁷ .................................................. G02C 5/04
[52] U.S. Cl. .............................................. 351/128
[58] Field of Search ...................... 351/124, 128, 351/131, 132, 137, 59, 107, 116

[56] References Cited

U.S. PATENT DOCUMENTS

| | | |
|---|---|---|
| 1,102,909 | 7/1914 | Hanna . |
| 2,446,725 | 8/1948 | Seguin . |
| 2,607,271 | 8/1952 | Morse, Sr. . |
| 2,622,477 | 12/1952 | Bechtel . |
| 3,085,472 | 4/1963 | Mack . |
| 3,495,898 | 2/1970 | Del Vecchio . |
| 3,840,294 | 10/1974 | Kneier . |
| 4,154,513 | 5/1979 | Goulden . |
| 4,405,213 | 9/1983 | Kolkmann . |
| 4,787,729 | 11/1988 | Ruffen . |
| 4,880,302 | 11/1989 | Meillet . |
| 5,146,245 | 9/1992 | Bolinger . |
| 5,200,771 | 4/1993 | Schmolz et al. ........................ 351/132 |

*Primary Examiner*—George Manuel
*Attorney, Agent, or Firm*—William Squire

[57] ABSTRACT

Eyeglasses for use in applying makeup includes an adjustable length nosepiece extension which sets the lenses a distance sufficiently spaced from the face to permit the application of makeup including fingers and implements to the eye and face regions including the cheeks and nose between and about the lenses and face while at the same time permitting the user to have corrected vision with the glasses in placep. Temple members have a bend to provide finger and implement access to the eyebrows, cheeks, nose and eyes from the side of the face without interference. The temple members also have a length that is adjustable to accommodate different users. The lenses are provided focal ranges and corrections for corrected vision to the user in the spaced apart position so that the user can clearly see the eye and face regions simultaneously while being made up.

20 Claims, 2 Drawing Sheets

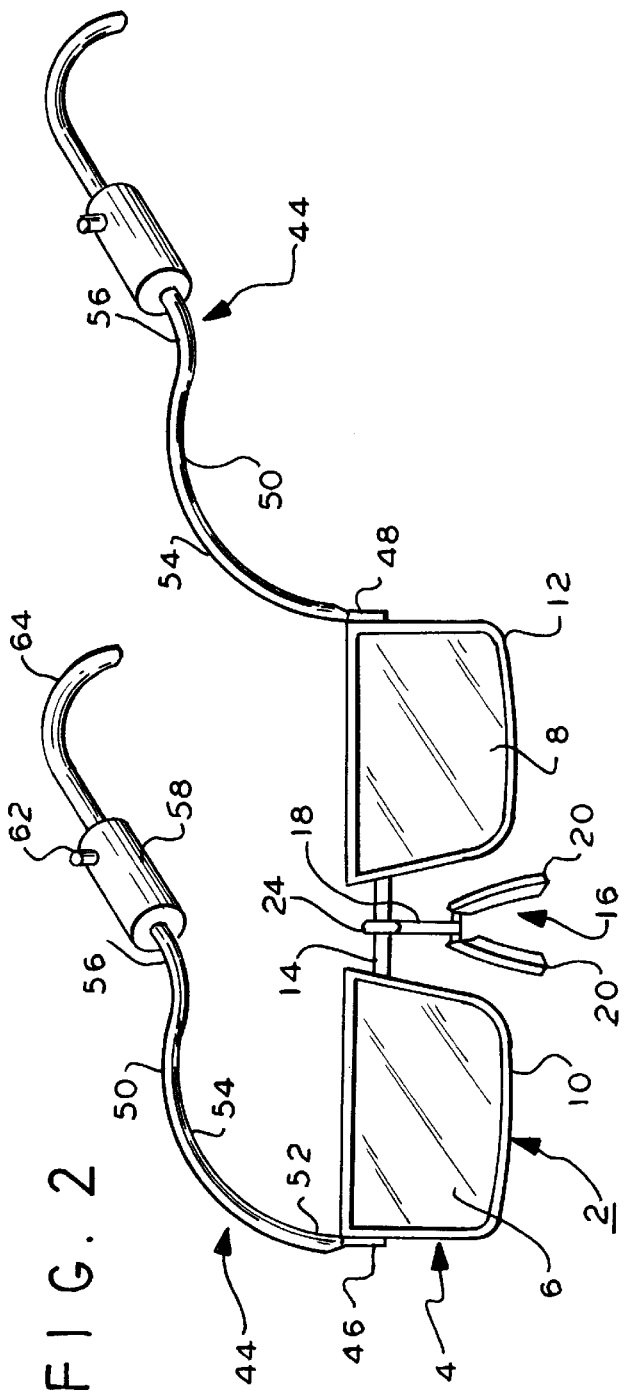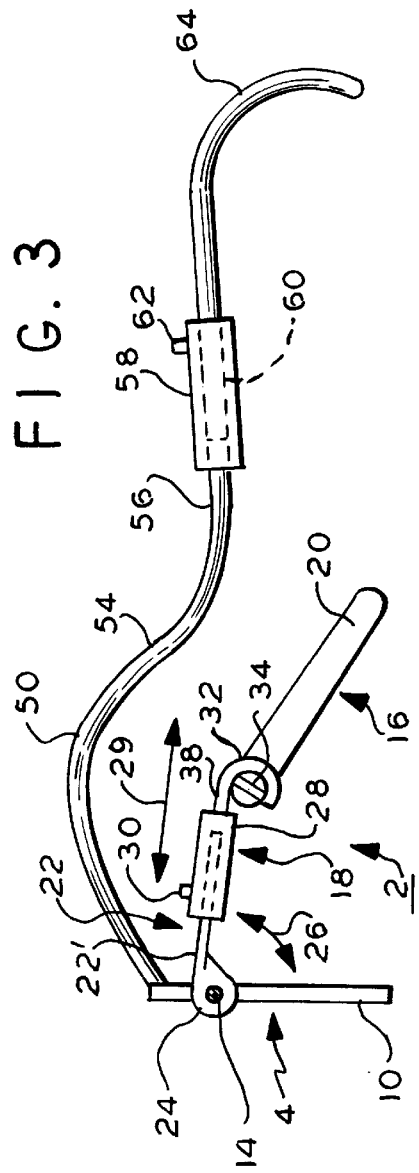

MAKEUP EYEGLASSES

This invention relates to eyeglasses to facilitate applying makeup to the face while wearing the glasses.

A long felt problem for persons with impaired vision who wear eyeglasses is applying makeup to the eyes and surrounding face region. The eyeglasses are needed to provide enhanced vision. However, the presence of the glasses impedes the application of the makeup to the facial area covered by the eyeglasses. Prior attempts to resolve this problem have met with little success because they do not address the underlying problem, i.e., providing access to the eye region while the lens is in place over the eye to which makeup is to be applied.

For example, U.S. Pat. No. 4,880,302 addresses the problem by providing a pivoting lens, which can be pivoted over each eye selectively. This frees the region of one eye for receiving makeup while the other eye employs the corrective lens for observation as the makeup is applied. The problem with this arrangement is that the eye closest to the makeup application has no lens and therefore vision impairment in that eye hinders the application of makeup to that eye. The other eye while having enhanced vision is not as close to the eye receiving the makeup and views that eye at an angle, which may distort the vision with respect to the application of makeup to the other eye.

A similar solution of providing pivoting lenses is provided in U.S. Pat. Nos. 3,495,898, 3,840,294 and 4,154,513. U.S. Pat. No. 4,405,213 provides a somewhat different solution, but suffers from the same deficiency. In this patent the lenses are secured in sliding frames which can slide each lens individually out of the way of an eye for applying makeup while the other lens is in position for correcting vision in the other eye. However, the eye receiving the makeup does not have a lens available for observation as the makeup is applied to that eye as also occurs in the pivoting lens patents.

The present inventor recognizes a need to provide eyeglasses that can be used to enhance vision in an eye simultaneously as the makeup is applied to that eye.

Makeup eyeglasses for vision impaired persons for permitting cosmetics to be applied to the eye region of a wearer's face by a wearer simultaneously while vision is enhanced by the eyeglasses according to the present invention comprises a frame for receiving at least one lens for enhancing vision in at least one eye of a person and means for supporting the frame spaced from the face a distance to permit access to the region between the at least one eye and the frame and received at least one lens for the application of makeup to the at least one eye with the glasses in position while enhancing vision in the at least one eye simultaneously during the applying of the makeup.

In one embodiment, the frame includes two lenses each for enhancing vision in a different corresponding eye of the wearer, the frame being spaced from the face a distance sufficient to permit finger access to the face region between each eye and the corresponding overlying lens.

In a further embodiment, a nosepiece is provided for supporting the frame on the nose of a person, the nosepiece including an extension for supporting the fiame in spaced relation to the wearer eyes and surrounding face region a distance sufficient to permit make up to be applied to the eye and surrounding face region by at least one of a finger and implement inserted between the at least one lens and surrounding face region and at least one temple member is also provided for supporting the frame in the spaced relation on the head of the wearer.

In a further embodiment, an adjustment device is secured to the nosepiece and frame for adjusting the spacing of the nosepiece to the frame.

Preferably in a further embodiment, at least one pivot is included for pivotally securing the nosepiece relative to the frame.

Preferably, a pair of temple members supports the frame at opposing sides of a person's head.

In a further embodiment, the temple member is pivotally secured to the frame.

In a still further embodiment, the temple member is elongated having a length, the temple member including adjustment means for adjusting the temple member length.

Preferably, the temple members are each elongated having a length, the temple members each including adjustment means for adjusting the temple member length.

In a still further embodiment, the temple member includes a bend at a region adjacent to the frame for providing unobstructed access to the wearer's eye and adjacent face region overlying the at least one lens and frame from the side of the face.

In a further embodiment, a pair of spaced pivots is secured to the nosepiece for pivotally securing the nosepiece relative to the frame.

Preferably the nosepiece comprises a cushion portion and an extension portion, the extension portion being pivotally secured to the frame and the nosepiece cushion portion by respective different pivots.

Preferably, adjustment means adjustably set the length of the extension.

IN THE DRAWING

FIG. 2 is an isometric view of the glasses of FIG. 1;

FIG. 3 is a sectional side elevation view of the glasses of FIG. 2; and

Figure 1:
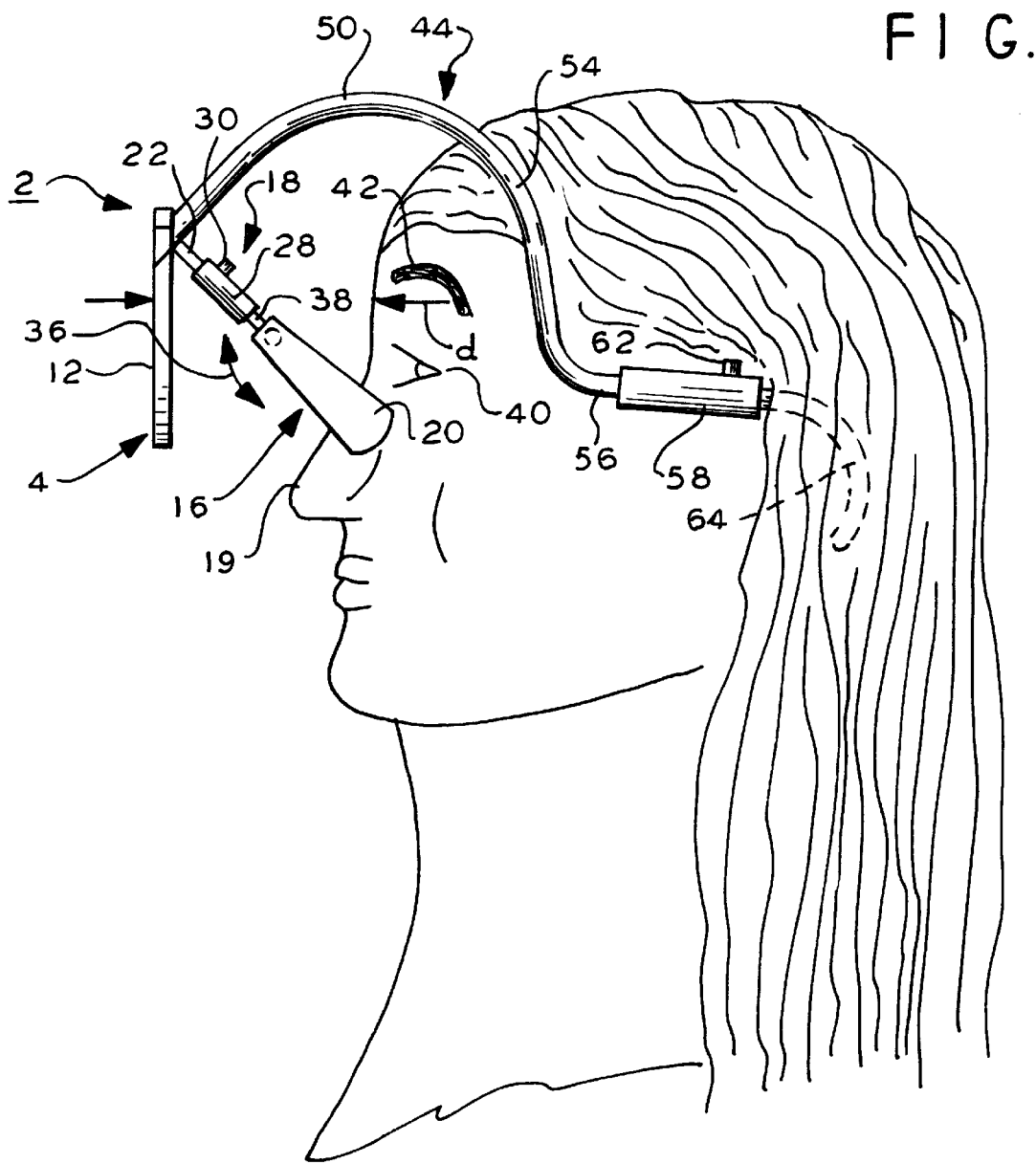
FIG. 1 is a side elevation view of a pair of eyeglasses according to an embodiment of the present invention as worn by a person.

In FIGS. 1–3, eyeglasses 2 comprise a frame 4 for receiving a pair of vision enhancing lenses 6 and 8. The lenses 6 and 8 may be of any typically prescribed configuration for various vision impairments, including bifocals, trifocals and so on for correcting near sightedness, far sightedness and so on. The frame 4 is of any conventional configuration. While two lenses are shown, one lens may be a dummy blank transparent element where vision needs to be corrected in only one eye.

The frame 4 comprises two lens-receiving sections 10 and 12 each for receiving a corresponding lens 6 and 8, respectively. The sections 10 may be of any shape or configuration including half frames in which a filament loop is used to secure the lenses in place. A nose bridge member 14 is fixed to the two sections 10 and 12. In this embodiment the sections 10 and 12 and member 14 may be molded one-piece thermoplastic material. In the alternative, the sections 10 and 12 and bridge member 14 may be of metal as in conventional frames. The bridge member 14 is preferably circular cylindrical.

A nosepiece support 16 is pivotally attached to the bridge member 14 by an adjustable extension 18. The support 16 may be thermoplastic material and serves as a pliable soft cushion against the nose 19, FIG. 1, of a person as in conventional nosepieces., The support 16 is generally U-shaped and has two legs 20, which straddle and abut the nose 18. The relative dimensions and configuration of the support 16 is not important and may comprise any configuration for this purpose such as two independent support legs or elements attached to an underlying metal or plastic element by screws as in prior art nosepieces, for example.

In FIG. 3, the extension 18 comprises a rod member 22 having an annular portion 24 (or semi-annular portion—not shown) which encircles entirely or partially the bridge 14. Portion 14 provides a bearing-journal arrangement for pivoting the extension 18 about tie bridge 14 in angular directions 26. Other relative pivoting arrangements may be provided in the alternative. The rod member 22 has an elongated section 22'. Extension 18 includes a coupler 28 having an elongated bore for slidably receiving the rod section 22'. The section 22' is adjustably set any desired distance directions 29 into the coupler 28 bore for setting the length of the extension 18.

The section 22' is fixed axially in place in the coupler 28 bore by a set screw 30. This adjustment sets the length of the extension 18 according to an individual user's face. The coupler 28 has an annular or hooked shaped member 32 fixed thereto via rod portion 38. The hook member 32 has an annular or semi-annular inner surface, which receives end engages journal-bearing portion 34 of support 16. Portion 34 is a circular cylindrical section which forms a journal bearing for rotating within the hook member 32 in directions 36, FIG. 1, which forms a journal. The extension 18 bearing-journals preferably have tight mating fits to frictionally hold the extension in position. The coupler 28 and portions 32 and 38 are preferably one-piece molded thermoplastic material.

The extension 18 may be fabricated in different dimensions to accommodate a wide range of extension lengths between the bridge 14 and support 16. Also, while the extension is pivoted to both the bridge and the support, it may be pivoted to either or in some instances not pivoted at all to provide a wide range of fits for different users.

The extension 18 provides a clearance distance d between the face of the person in the surrounding eye region 40 including the eyebrows 42. This distance d is sufficiently great for a person to place a finger or fingers and the held makeup implements in this region to apply makeup directly to the eye, eyebrow and adjacent eye region 40 of the face with the corresponding lens 8 or 10 in place for the eye being made up. The lenses correct for the vision impairment so that the person sees the region clearly and in focus for accurately applying the makeup with the eye that is closest to the region being made up.

A pair of mirror image temple members 44 are each hinged to the frame on opposite sides at respective hinges 46, 48, FIG. 2. The hinges 46, 48 are conventional. Temple member 44 is representative and is made of either metal or reinforced molded thermoplastic material as known in this art. Member 44 is generally rod like in transverse shape and has a relatively large bend 50 adjacent to one end 52. End 52 is attached to a hinge 46 or 48. The bend 50 is sufficiently large to permit the hand, finger or fingers of a person holding a makeup implement to apply make up from the side of the face to the eye brow 42 region. The bend 50 is preferred. The dimensions of the bend are determined according to the size of the head to be accommodated and can be made in different sizes for different persons. The bend may be arcuate, rectangular or any other shape. The shape of the bend is not important as long as it provides the desired room to apply the makeup from the side of the face without interference from the temple members 44.

Rod 54 forming the temple member 44 terminates at an end 56 distal the hinges 46, 48 at coupler 58. The coupler 58 is molded one piece with the rod 54. In the alternative, if the rod 54 is metal, the coupler may be metal and welded to the rod 54. The coupler 58 has a longitudinal bore 60. A set screw 62 is mounted in the coupler 58 in communication with the bore 60. An ear section 64 comprising a further rod is inserted axially into the bore 60 and axially positioned and fixed in place by screw 62. This adjustment allows for different size heads to be accommodated by the adjusted temple member 44 length while maintaining the distance d. The coupler 58 length is determined for the amount of adjustment needed for different implementations. The temple members may be provided with different size couplers 58 for this purpose. Thus a pair of eyeglasses 2 may be fitted to an individual regardless the size of that person's head. The important factor is that the temple members are adjusted to maintain the desired distance d for the application of makeup without removing the glasses.

The lenses 6 and 8 are provided either by prescription or over the counter in different magnifications for accommodating persons with different vision impairments. The lenses are easily replaced in the frames in a manner known in this art and can be provided a person according to an individual's specific vision needs. Frames may be provided with sets of different lenses for different individual users. Providing couplers and mating elements of different lengths for different users may vary the amount of adjustment. While the lenses are positioned a distance from the user's eyes, the lenses provide the needed visual enhancement for these distances. The lenses are fabricated to accommodate such distances d. Of course, normal lenses for use in typical eyeglasses can not be used in this manner because of the different focal lengths involved. Lenses of the desired focal lengths for the eyeglasses 2 are thus needed and provided accordingly.

Figure 4:
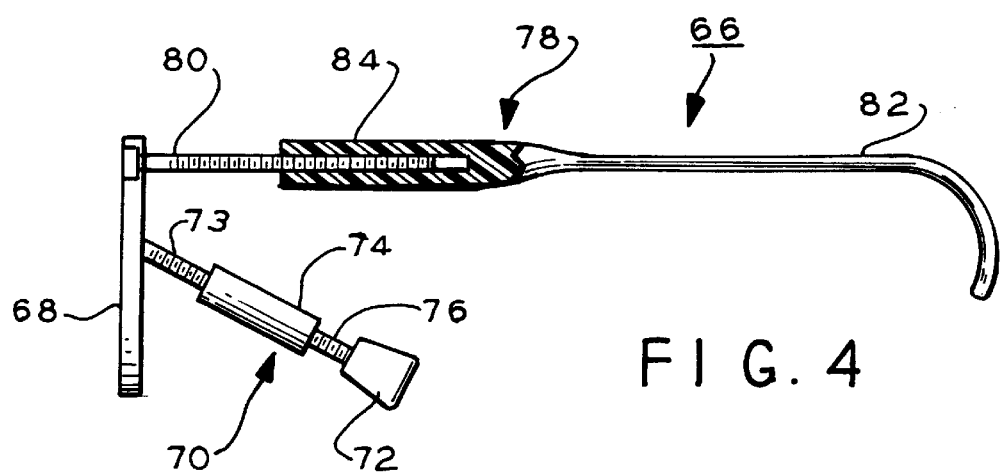
FIG. 4 is a side elevation view partially in section of a pair of eyeglasses according to a second embodiment of the present invention.

In FIG. 4, eyeglasses 66 comprise a frame 68 having lenses (not shown). A bridge is provided as shown in FIG. 2. Extension 70 connects nose support 72 to the bridge. Support 72 is as described in FIGS. 1–3. The extension 70 comprises a threaded rod 73 pivoted to the bridge and in threaded engagement with coupler 74 having a threaded bore. A second threaded rod 76 connects the support 72 to coupler 74. The rod 76 is also threaded in the coupler 74 bore. Rotation of the coupler adjusts the axial distance between the support 72 and the bridge. This extension may be used in the alternative in the embodiment of FIG. 1 as well.

Temple member 78 comprises a straight threaded rod 80 hinged to the frame 68. An ear temple member 82 is formed of a rod comprising reinforced molded thermoplastic material or metal. A coupler 84 is molded one-piece integral with the member 82 if plastic or welded if metal. The coupler 84 has a threaded bore for receiving the threaded rod 80. The nosepiece and the temple members are adjusted to set the distance d, FIG. 1, as described above. In this case the temple members do not have a bend, which is optional. In the alternative, a bend such as bend 50, FIG. 1, may be provided the temple members 66. For some people, the bend 50 may not be necessary or desired in that access to the desired face eye region distance d (FIG. 1) may be provided solely by the nosepiece extension 70.

An advantage of the eyeglasses of the present invention is that the wearer can clearly observe through the lens or lenses the entire face of the wearer while applying the make up. Typically eyeglass wearers have vision impairment in both eyes and the ability to see clearly through both eyes simultaneously while applying makeup is advantageous for applying the makeup correctly. Since makeup is also applied to the cheeks, nose, and lips, the ability to see clearly all of these features at the same time while applying makeup to the eye region is advantageous not available in prior art makeup eyeglasses.

It will occur to one of ordinary skill that various modifications may be made to the disclosed embodiments, which are given by way of illustration and not limitation. It is intended that the scope of the invention is as set forth in the appended claims.

What is claimed is:

1. Makeup eyeglasses for vision impaired persons for permitting cosmetics to be applied to the eye region of a wearer's face by a wearer simultaneously while vision is enhanced by the eyeglasses comprising:

a frame for securing at least one vision enhancing lens;

a nosepiece for supporting the frame on the nose of a person, the nosepiece including an extension for supporting the frame in spaced relation to the wearer eyes and surrounding face region a distance sufficient to permit make up to be applied to the eye and surrounding face region between the at least one lens and surrounding face region; and at least one temple member for supporting the frame in the spaced relation on the head of the wearer.

2. The eyeglasses of claim 1 including an adjustment device secured to the nosepiece and frame for adjusting the spacing of the nosepiece to the frame.

3. The eyeglasses of claim 1 including at least one pivot for pivotally securing the nosepiece relative to the frame.

4. The eyeglasses of claim 1 including a pair of temple members for supporting the frame at opposing sides of a person's head.

5. The eyeglasses of claim 4 wherein the temple members are each elongated having a length, the temple members each including adjustment means for adjusting the temple member length.

6. The eyeglasses of claim 1 wherein the temple member is pivotally secured to the frame.

7. The eyeglasses of claim 1 wherein the temple member is elongated having a length, the temple member including adjustment means for adjusting the temple member length.

8. The eyeglasses of claim 1 wherein the temple member includes a bend at a region adjacent to the frame for providing unobstructed access to the wearer's eye and adjacent face region overlying the at least one lens and frame from the side of the face.

9. The eyeglasses of claim 1 including a pair of spaced pivots secured to the nosepiece for pivotally securing the nosepiece relative to the frame.

10. The eyeglasses of claim 9 wherein the nosepiece comprises a cushion portion and an extension portion, the extension portion being pivotally secured to the frame and said nosepiece cushion portion by a respective different pivot.

11. The eyeglasses of claim 10 including adjustment means for adjustably setting the length of said extension.

12. The eyeglasses of claim 1 wherein the frame includes means for releaseably receiving a plurality of at least one lens each of different optical properties.

13. Makeup eyeglasses for vision impaired persons for permitting cosmetics to be applied to the eye region of a wearer's face by a wearer while vision is enhanced by the eyeglasses comprising:

a frame for securing at least one vision enhancing lens;

a nosepiece for supporting the frame on the nose of a person, the nosepiece including an adjustable extension for supporting the frame in settable spaced relation to the wearer eyes and surrounding face region a settable distance sufficient to permit make up to be applied to the eye and surrounding face region by at least one of a finger and makeup application implement inserted between the at least one lens and surrounding face region; and a pair of temple members for supporting the frame in the spaced relation on the head of the wearer.

14. The eyeglasses of claim 13 including pivot means for pivotally securing the nosepiece to the frame.

15. The eyeglasses of claim 13 including a pair of temple members and adjustment means for adjusting the length of each of the pair of temple members.

16. The eyeglasses of claim 13 including a pair of temple members, each member including a bend at a region adjacent to the frame for providing unobstructed access to the wearer's eye and adjacent face region overlying the at least one lens and frame from the side of the face.

17. The eyeglasses of claim 16 including means for pivotally securing the temple members to the frame.

18. Makeup eyeglasses for vision impaired persons for permitting cosmetics to be applied to the eye region of a wearer's face by a wearer simultaneously while vision is enhanced by the eyeglasses comprising:

a frame for securing at least one vision enhancing lens;

a nosepiece for supporting the frame on the nose of a person, the nosepiece including an adjustable extension pivotally secured to the frame for supporting the frame in settable spaced relation to the wearer eyes and surrounding face region a settable distance sufficient to permit make up to be applied to the eye and surrounding face region by one or more fingers inserted between the at least one lens and surrounding face region; and a pair of temple members for supporting the frame in the spaced relation on the head of the wearer, the temple members each including a bend adjacent to the frame for providing unobstructed access to the wearer's eyes and adjacent face regions overlying the at least one lens and frame from the side of the face, the temple members each including adjustment means for adjusting the length of the corresponding temple member.

19. Makeup eyeglasses for vision impaired persons for permitting cosmetics to be applied to the eye region of a wearer's face by a wearer simultaneously while vision is enhanced in at least one eye by the eyeglasses comprising:

a frame for receiving the at least one lens for enhancing vision in at least one eye of a person; and means for supporting the frame spaced from the face a distance to permit access to the region between the at least one eye and the frame and received at least one lens for the application of makeup to the at least one eye with the glasses in position while enhancing vision in the at least one eye simultaneously during the applying of the makeup.

20. The eyeglasses of claim 19 wherein the frame includes two lenses for enhancing vision in a different corresponding eye of the wearer, the frame being spaced from the face a distance sufficient to permit finger access to the face region between each eye and the corresponding overlying lens.

\* \* \* \* \*